Inventor:
John Marshall, Jr.

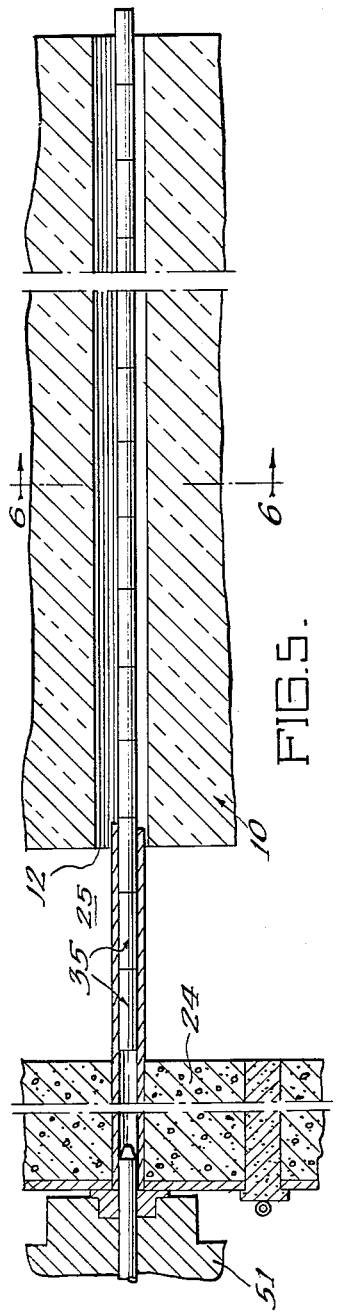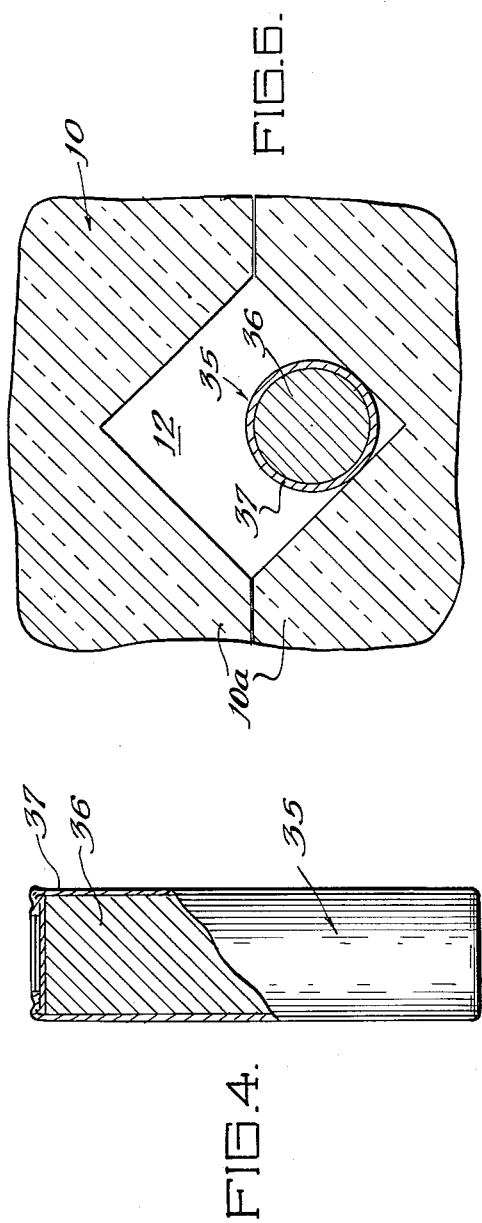

3,005,765
DENSITY CONTROL IN A REACTOR
John Marshall, Jr., Chicago, Ill., assignor to the United States of America as represented by the United States Atomic Energy Commission
Filed Feb. 21, 1946, Ser. No. 649,406
1 Claim. (Cl. 204—193.2)

The present invention relates to a device of primary use for the production of the transuranic element $94^{239}$ by neutrons released during a self-sustaining nuclear chain reaction through fission of uranium with slow neutrons. Such a device, which is usually called a neutronic reactor, is more fully described in Fermi et al. Patent 2,708,656, dated May 17, 1955. Natural uranium may be used in the reaction and contains the isotopes $92^{238}$ and $92^{235}$ in the ratio of approximately 139 to 1. Hereinafter in the specification and the claims the term uranium is to be understood as referring to uranium and its chemical compositions of normal isotopic content, unless otherwise indicated by the context.

In a self-sustaining chain reaction of uranium with slow neutrons, $92^{238}$ is converted by neutron capture to the isotope $92^{239}$. The latter is converted by beta decay to $93^{239}$ and this $93^{239}$ in turn is converted by beta decay to the transuranic element $94^{239}$. By thermal neutron capture, $92^{235}$ on the other hand, undergoes nuclear fission to release energy appearing as heat, gamma and beta radiation, together with the formation of fission fragments appearing as radioactive isotopes of elements of lower mass numbers, and with the release of secondary neutrons.

The secondary neutrons thus produced by the fissioning of the $92^{235}$ nuclei have a high average energy, and must be slowed down to thermal energies in order to be in condition to cause slow neutron fission in other $92^{235}$ nuclei. While some of the secondary neutrons are absorbed by the uranium isotope $92^{238}$ leading to the production of $94^{239}$, and by other materials, enough can remain to sustain the chain reaction.

Under these conditions, the chain reaction will supply not only the neutrons necessary for maintaining the neutronic reaction, but also will supply the neutrons for capture by the isotope $92^{238}$ leading to the production of $94^{239}$.

As $94^{239}$ is a transuranic element, it can be separated from the unconverted uranium by chemical methods, and as it is thermally fissionable (fissionable by thermal neutrons) in a manner similar to the isotope $92^{235}$, it is valuable for enriching natural uranium for use in other chain reacting systems of smaller overall size, or it may itself be used as the thermally fissionable material of a neutronic reactor. The fission fragments are also valuable as sources of radioactivity.

The ratio of the number of secondary neutrons produced by the fissions to the original number of primary neutrons producing the fissions in a chain reacting system of infinite size using specific materials is called the reproduction factor of the system and is denoted by the symbol K. It can be shown that $$K = 1 - M^2 \Delta$$

where $\Delta$ is a number given to the ratio of $\Delta n$ to $n$ where $n$ is the number of thermal neutrons per cubic centimeter at a point in the reactor; and M is the migration length which is a mean distance between the place of birth of a neutron and the place of capture. $M^2$ is known as the migration area. Thus, it can be seen that K is reduced when $M^2$ is increased for a fixed value of $\Delta$.

When K is made sufficiently greater than unity to create a net gain in neutrons and the system is of a size such that this gain is not entirely lost by leakage from the exterior surface of the system, then a practical self-sustaining chain reacting system producing power by nuclear fission of natural uranium is obtained. The neutron reproduction ratio in a system of finite size differs from K by the exterior neutron leakage factor, and must still be sufficiently greater than unity to permit the neutron density to rise exponentially. Such rise will continue indefinitely if not controlled at a density corresponding to a desired power output.

To more fully understand the operation of a uranium neutronic reactor, the following brief explanation is given. During the interchange of neutrons in a system comprising bodies of uranium of any size disposed in a slowing medium or moderator, neutrons may be lost in four ways: by absorption in the uranium metal or compound, by absorption in the slowing down material or moderator, by absorption in impurities present in the system, and by leakage out of the system. A portion of those neutrons absorbed by the uranium metal or compound cause fission of $U^{235}$ which produces more neutrons. In general, several neutrons are produced for each fission caused by a neutron and consequently sufficient neutrons are produced to make up for the neutrons lost and those consumed in the fission of $U^{235}$.

Natural uranium, particularly by reason of its $U^{238}$ content, has an especially strong absorbing power for neutrons when they have been slowed down to moderate energies. The absorption in uranium at these energies is termed the uranium resonance absorption or capture. It is caused by the isotope $U^{238}$ and does not result in fission but creates nucleus $92^{239}$ which decays as previously described. It is not to be confused with absorption or capture of neutrons by impurities, referred to later. Neutron resonance absorption in uranium may take place either on the surface of the uranium bodies in which case the absorption is known as surface resonance absorption, or it may take place further in the interior of the uranium body, in which case the absorption is known as volume resonance absorption. Volume resonance absorption is due to the fact that some neutrons undergo collisions with atoms inside the uranium body and may thus arrive at resonance energies therein. After successfully reaching thermal energies, about 40 percent of the neutrons are also subject to capture by $U^{238}$ without fission, leading to the production of $94^{239}$.

It is possible by proper physical arrangement of the materials in the moderator to control the amount of uranium resonance absorption. By the use of a light element such as carbon in the form of graphite, relatively few collisions are required to slow the neutrons to thermal energies and, hence, neutrons have a small migration area $M^2$ therein, thus decreasing the probability of a neutron being at a resonance energy as it enters a uranium atom. During the moderating process, however, neutrons are diffusing through the slowing medium over random paths and distances so that the uranium is not only exposed to thermal neutrons but also to neutrons of energies varying between the energy of fission and thermal energy. Neutrons at uranium resonance energies will, if they enter uranium at these energies, be absorbed on the surface of a uranium body whatever its size, giving rise to surface absorption. Any substantial change of overall surface of the same amount of uranium will change surface resonance absorption. Thus, the volume ratio of moderator to uranium will control resonance absorption losses of neutrons in the uranium, and this fact can be utilized to change the K factor of the reactor. The uranium may be placed in the system in the form of spaced uranium masses or bodies of substantial size, either of metal, oxide, carbide, or combinations thereof. The uranium bodies may be in the form of layers, rods or cylinders, cubes or spheres, or other shapes, dispersed throughout the graphite, preferably in some geometric pattern. The term geometric is used to mean any pattern or arrangement wherein the uranium bodies are distributed in the graphite with at least a roughly uniform spacing or with a roughly uniform size and shape or are systematic in variations of size or shape to produce a volume pattern conforming to a generally symmetrical system. If the pattern is a repeating or rather exactly regular one, the structure may be conveniently described as a lattice structure. Optimum conditions are obtained when natural uranium is used in the form of metal spheres, but short cylinders are substantially equivalent.

The K factor of a mixture of fine uranium particles in graphite, assuming both of them to be theoretically pure, has been calculated to be about .785. Actual K factors as high as 1.07 have been obtained using aggregations of natural uranium into bodies of substantial size dispersed in moderators in various geometries, and with as pure materials as it is presently possible to obtain.

The thermal neutrons are also subject to capture by the moderator. While carbon has a relatively low capture cross-section for thermal neutrons, an appreciable fraction of thermal neutrons (about 10 percent of the neutrons present in the system under best conditions with graphite) is lost by capture in the moderator during diffusion therethrough.

The neutronic chain reaction referred to can be made self-sustaining in the device known as a neutronic reactor wherein uranium bodies are dispersed in an efficient neutron slowing medium or moderator, when the reactor is made to be just above a critical size where the net rate of neutron generation inside the reactor is equal to the rate of neutron loss from the exterior of the reactor. Under these conditions, a self-sustaining nuclear chain reaction can be obtained within the reactor having any neutron density desired. However, to prevent destruction of the reactor, the heat of the reaction must be removed in an amount providing a stable temperature in the reactor at some predetermnied and controlled operating level. As the greater the number of fissions, the greater the number of neutrons are present to produce $92^{239}$, converting to $94^{239}$ is accelerated by operating the reactor at high neutron density levels.

It will be understood that the choice of fissionable and moderator materials, the pattern of distribution of the fissionable material in the moderator, the critical size of the reactive composition comprising fissionable material and moderator required to maintain the self-sustaining reaction, and the means employed to remove the heat generated in the reaction in themselves constitute no part of the present invention, being now known to persons skilled in the art as exemplified in the above-mentioned co-pending application.

A stable temperature in an uncooled neutronic reactor composed entirely of moderator and thermally fissionable material such as, for example, graphite and uranium metal, can only be attained at a relatively low power output as the heat generated can be dissipated only by conduction out of the reactor. Higher power outputs with greater production of $94^{239}$ require additional heat removal, such as by circulation of a fluid.

However, proper heat removal is complicated by the fact that in a neutronic reactor where the uranium bodies or other bodies of thermally fissionable material are in a lattice of uniform size and spacing and where the moderator is also of uniform density, nuclean fission and heat generation due to the chain reaction are both greatest at the center of the reactor and least at its edges, both activities following an approximate cosine curve distribution from the center to the edge of the reactor, as will be pointed out later. Such a centrally peaked activity limits the total power at which the reactor can operate to a power where the more central uranium bodies are operating at a maximum permissible temperature. In other words, the temperature of the uranium at the center of the reactor is a controlling factor. The total power output, under these circumstances, can therefore be only the average power developed in the reactor when the uranium at the center of the reactor has reached the maximum permissible temperature. If, however, the reactor activity curve can be flattened across the reactor, then the central peak power can still remain at the maximum permissible value and the total power output of the reactor can be increased. One method of flattening this activity curve is described in Young Patent 2,774,730, dated December 18, 1956.

It is a principal object of the invention to so design a neutronic reactor that the maximum local heat generation due to nuclear fission is obtained over a large volume of the reactor so that operating power can be increased without damage to the reactor.

Flattening of the reactor activity curve across the reactor is also advantageous in that the local heat generation is rougly proportional to the local absorption of neutrons by $U^{238}$. In other words $94^{239}$ will eventually be formed in the uranium bodies in accordance with the neutron density to which the bodies are exposed. Flattening the reactor activity curve across the reactor will permit a greater number of uranium bodies to be subjected to high neutron densities.

As migration area can control the K factor of a reactor structure, lattices having different migration areas can provide different K factors in a neutronic reactor. Ordinarily, neutronic reactors have lattices in which uranium bodies of uniform size and shape are placed in a uniform moderator with uniform spacing throughout. This results in the absence of compensating factors in a reactor having a peaked central neutron density, and in consequence, a peaked central heat production.

However, by varying the effective density of the moderator in different concentric zones of the reactor, thus varying K, and particularly by using a lattice having the lowest K factor in the center zone of the reactor, the reactor activity curve can be appreciably flattened across the reactor, resulting, for the same total power, in lowering the relative central peak neutron density and in raising the neutron density in outer zones. In consequence, the activity is spread more uniformly throughout the reactor. Cooling becomes more efficient and when the central uranium bodies are raised to their maximum permissible operating temperature, the total power output of the reactor with a flattened activity curve across the reactor is increased for the same central uranium body temperature. The amount of uranium exposed to high neutron densities is increased, and the yield of $94^{239}$ is thereby increased. By proper flattening of the activity curve the overall power of a reactor may be increased as much as 35 percent.

This invention relates particularly to changing the activity curve across a reactor by varying the neutron migration area in the moderator which will in turn vary the K factor. Thus, in a graphite moderated reactor, if the graphite in the central volume of the reactor has a smaller effective density than the graphite in the remainder of the reactor, the neutron migration area will be greater in the central volume of the reactor than elsewhere and the K factor will be smaller in the central volume. The migration area varies inversely with the effective density of the graphite. This is true because the more atoms present in a given volume of a given moderator, the more chance of a neutron collision, and therefore the smaller the distance which the neutron travels before being slowed to thermal energies and then absorbed.

The effective density of the graphite may be reduced by compressing it less than maximum in manufacture, leaving voids in the graphite in the formation thereof or drilling out portions of said graphite.

It is, therefore, another object of the invention to provide a method and means of changing the neutron activity curve of a reactor by varying the effective density of the moderator in different zones of said reactor.

Other objects and advantages of the invention may be more clearly understood by reference to the following description and the attached drawings which illustrate as an example one form of a reactor in which the invention may be used. This example of a uranium-graphite, air-cooled reactor is not to be taken as limiting, as the invention, within the scope of the appended claim, can be used in any type of neutronic reactor wherein uranium bodies or other thermally fissionable bodies are disposed in a moderator.

In the drawings:

FIG. 4 is a longitudinal sectional view, partly in elevation, of a jacketed uranium slug;

FIG. 5 is an enlarged diagrammatic longitudinal sectional view, partly in elevation, of a horizontal channel of the reactor during a loading and unloading operation;

FIG. 6 is an enlarged cross-sectional view taken as indicated by the line 6—6 in FIG. 5.

Figure 1:
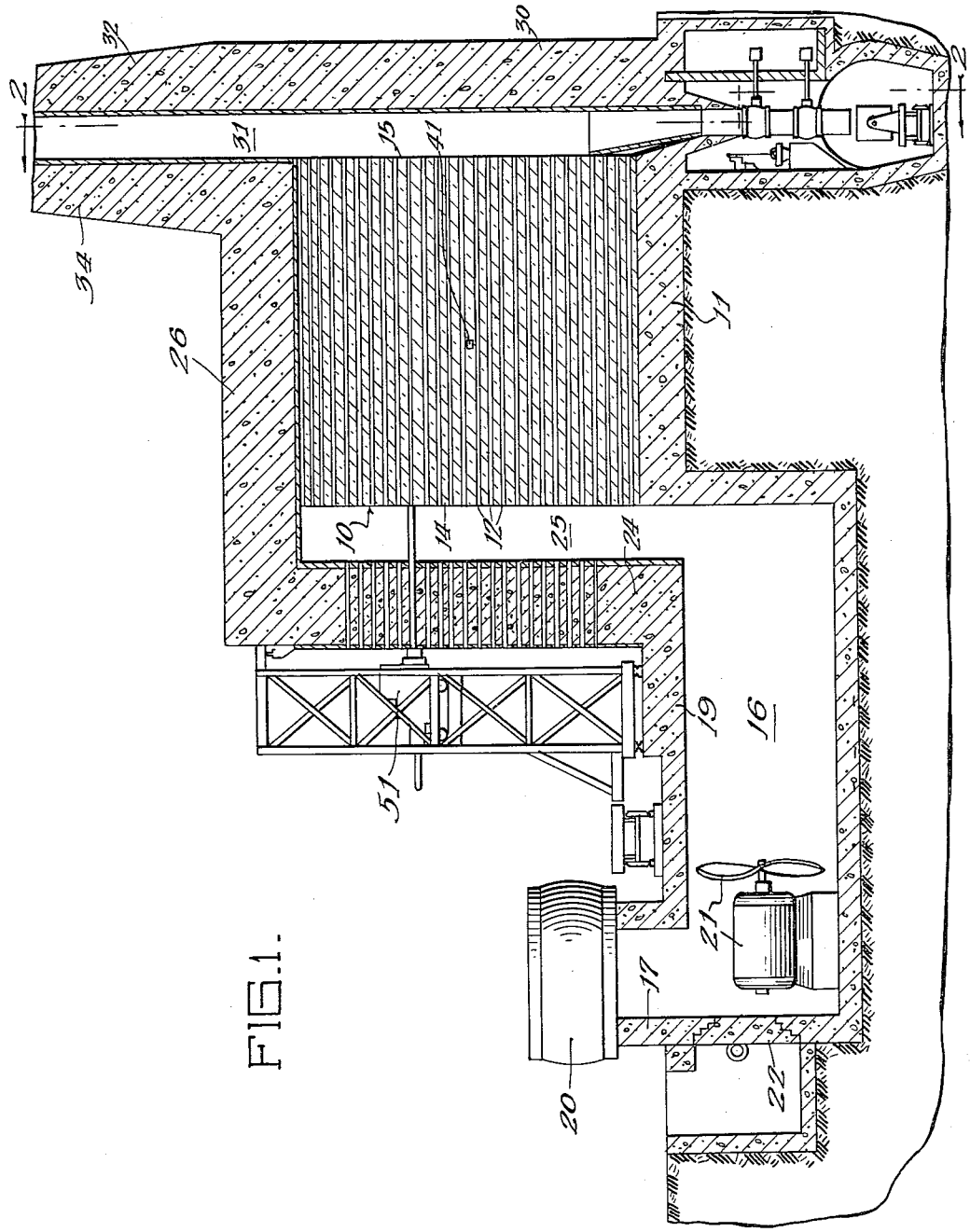
FIG. 1 is a diagrammatic longitudinal cross-sectional view, partly in elevation, of an air-cooled neutronic reactor system illustrating the invention.

Referring to the drawings, the invention is illustrated first by reference to an air cooled graphite uranium reactor, sometimes known as a pile, loaded in accordance with a uniform moderator and uniformly spaced rod geometry to give a normal peaked activity curve. Then is described how the same structure can be changed to flatten the activity curve.

Figure 2:
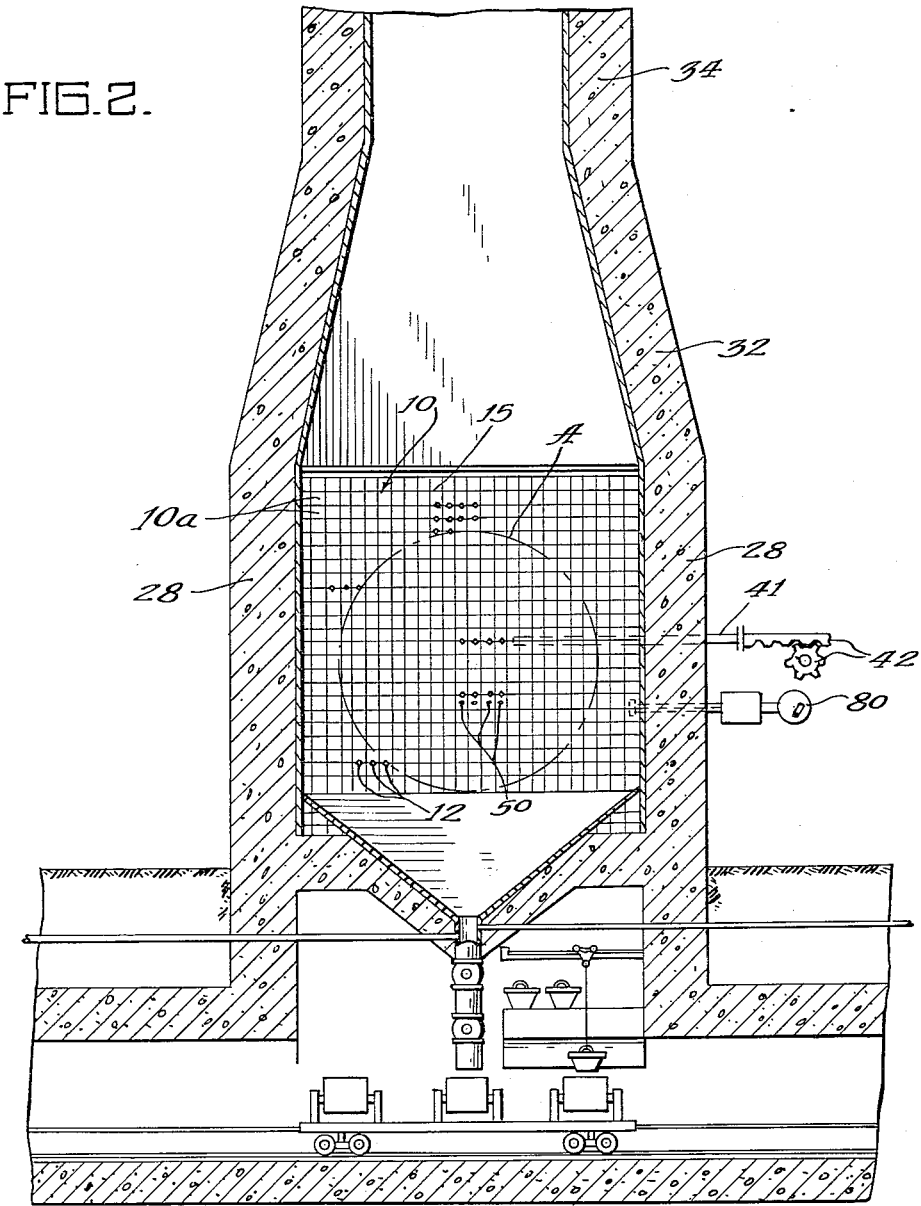
FIG. 2 is a cross-sectional view, partly in elevation, taken as indicated by the line 2—2 in FIG. 1.

Such a structure broadly comprises a mass of graphite blocks 10a closely piled or stacked into a cube 10 shown in FIGS. 1 and 2. This graphite cube may be, for example, 28 feet on a side. It rests on a concrete foundation 11. The graphite cube 10 is pierced with horizontal air channels 12 of square cross-section, with one of the diagonals vertical, as shown in FIG. 6. These channels may be readily made by grooving adjacent blocks 10a. The channels are 1.75 inches on a side and extend completely through the reactor, from an inlet face 14 to an outlet face 15. About 2000 channels may be provided, and, as will be later brought out, any unused channels can be plugged. Only a few of the channels are shown in the drawing for the sake of clarity. Each channel and its surrounding graphite forms a unit cell which may be repeated throughout the moderator.

Adjacent the inlet face 14 of the cube, the foundation is continued downwardly to form the floor of an inlet air duct 16 extending outwardly. The inlet air duct 16 is completed by concrete side walls 17 and top 19.

At some distance away from the graphite cube 10, the inlet duct is turned upwardly to terminate in an air filter 20, relatively close to the surface of the ground. A fan or blower 21, here illustrated as electrically driven, is installed on the floor of the inlet duct just below the air filter, access to the fan being conveniently obtained through duct door 22 behind the fan.

The concrete top 19 of the inlet air duct is continued upwardly as an inlet end shield 24, positioned parallel to but spaced away from inlet face 14 of the cube 10 to form an inlet chamber 25 communicating with the air channels 12.

Above the inlet chamber 25 and the cube 10, the concrete is continued horizontally to form a top shield 26, and side shields 28 are built up from the foundation 11 to enclose cube 10. Shields 26 and 28 closely approach the top and side faces of the cube, to minimize air flow around the outside of the cube. A small amount of air circulation, however, may be desirable over the top and side faces to cool these faces.

At the outlet face 15, an outlet end shield 30 of concrete is provided. End shield 30 is parallel to and spaced from the outlet face 15 of the graphite cube 10 to form an outlet chamber 31 communicating above with a stack 34 projecting upwardly and formed as a continuation of the concrete top, side, and outlet end shields. Thus the cube 10 is completely enclosed by concrete shields, with a duct system operating by virtue of pressure provided by fan 21 to conduct air from close to ground level through channels 12 into the stack and then into the atmosphere well above ground level at the top of the stack. The concrete shields may be from five to ten feet thick in accordance with the maximum desired operating power of the reactor and serve as shields to reduce escape of neutrons and gamma radiation.

As a neutronic reaction will take place when uranium bodies are properly spaced in a moderator mass of a certain finite size, the above-described device can be made chain reacting by placing uranium bodies in the horizontal channels in such a manner and in such an amount that a neutron reproduction ratio of slightly over unity is obtained, exclusive of all neutron losses within the reactor and to the exterior of the reactor.

Using the graphite mass as the moderator to slow fast neutrons to energies where they again are able to create fission in $92^{235}$, the device as described will have a reproduction ratio of unity when approximately 700 of the channels 12 in the graphite cube are each loaded with 68 aluminum jacketed uranium slugs 35 lying end to end, with a channel spacing of 7 inches measured center to center, and with the loaded channels roughly defining a cylindrical active portion as indicated by line A in FIG. 2. Both graphite and uranium should be of highest possible purity.

However, more than a unity reproduction ratio is required, as when the reproduction ratio is exactly unity no rise in neutron density will occur. Under such conditions the device will not develop high neutron densities or power in the form of heat. By loading additional channels, i.e., making the active portion greater than critical size, however, the reproduction ratio within the reactor can be brought above unity in order that a rise in density can occur. Then this excess neutron reproduction can be absorbed by neutron absorbing materials deliberately inserted into the reactor in order to hold the reproduction ratio at an average value of unity after a desired power output has been obtained, as a result of the initial rise in density.

Consequently, in accordance with the amount of excess reproduction ratio desired, about 1000 channels may be loaded with uranium slugs. Most of the channels not loaded with uranium may be closed by inserting plugs, preferably of graphite, in such channels in order to conserve air. Some of the channels, however, in the peripheral portions of the cube may be left open for cooling of the graphite in those portions.

One preferred form of slug construction for rod geometry is shown in FIG. 4. In this case, each slug 35 comprises a uranium metal rod 36, 1.1 inches in diameter and 4 inches long covered with an aluminum jacket 37 approximately 20 mils thick in good heat conductive relation to the uranium. The slugs weigh about 2½ pounds each. The jacket 37 completely encloses and seals the uranium, preventing air or other cooling fluid from corroding the uranium and also preventing fission gragments created by nuclear fission at the surface of the uranium from entering the air stream.

The channels are loaded with uranium until the active portion is over critical size, for example, to a size where the reproduction ratio, with neutron absorbers removed, is about 1.005. This geometry provides, with a channel spacing of about seven inches, a volume ratio of about 47 carbon to 1 uranium and a K factor for the rod lattice of about 1.06. As the K factor of 1.06 is reduced to a reproduction ratio of 1.005 by the reduction in size of the reactor from infinity to the operating size, the reproduction ratio of 1.005 means that for every two hundred neutrons starting in each neutron generation about two hundred and one neutrons can be produced in the operating reactor over and above all losses. Under these conditions and taking into account the fact that about one percent of the neutrons of fission are delayed in their emission for a mean time of about 5 seconds the neutron density of the reactor will double every 8 to 15 seconds. With some part of neutron absorbing control and safety rods (described below) inserted but with the insertion of less than the amount of neutron absorbers required to make the reproduction ratio unity, the rise is slower. When the neutron absorbers are almost, but not entirely inserted, a single doubling of the neutron desity may take several hours. When a desired density has been reached, the reproduction can be reduced to unity so that the desired density is continuously maintained by the neutron absorption in the inserted neutron absorbing materials.

For control of the reactor neutron absorbing material may be introduced into the reactor in the form of a control rod 41 as shown diagrammatically in FIG. 2. This control rod extends into the graphite cube, sliding in a channel therein and is operated from outside of side shield 28 as by rack and pinion 42. The rod is made from, or incorporates therein, an efficient neutron absorber, such as, for example, cadmium or boron. A sheet of cadmium riveted to a steel strip forms a satisfactory control rod. As the depth of insertion of the rod determines the amount of neutron absorbing material inside the reactor, the critical position of the rod is where the rate of neutron absorption by the rod balances the reproduction ratio at unity. Thus, by moving the rod outwardly from the critical position the neutron density in the reactor will be caused to rise. Moving the rod inwardly from the critical position causes the reproduction ratio to fall below unity, and the reaction stops, thus the reaction is always under control, and as the rise in neutron density is exceptionally slow as the rod approaches the critical position, manual control is possible. Other and similar rods may be provided, if desired, for rapid progression into the reactor to stop the reaction in case of failure of the control rod to stop the rise in neutron density for any reason. Such rods are termed safety rods. An ionization chamber 80 is used to indicate neutron density.

During operation heat is released in the reactor in accordance with the neutron density therein. Most of the heat rises from the kinetic energy of the fission fragments and about 92 percent of the energy is released in the uranium. About 6 percent is released in the graphite due to neutron absorption therein and about 2 percent escapes from the reactor in the form of neutrons and gamma radiation. Consequently, the reactor can only be operated at a power dependent upon heat removal to the point where a stable temperature obtains. Otherwise, the reactor will accumulate heat to the point that the device may be damaged.

A stable temperature is obtained by passing atmospheric air through the reactor in the specific example shown and described, and the air is passed through the graphite channels and directly in contact with the aluminum jackets of the slugs. Under these circumstances the reactor can be operated continuously at 2500 kilowatts electrical equivalent of heat by passing 32,000 cubic feet per minute through the reactor with a maximum temperature of the slugs of about 100° C., and at 5000 kilowatts continuously with about 50,000 cubic feet per minute of air with a maximum metal temperature of 200° C. These heat maxima occur at the center of the reactor loaded as described, and total power output is determined by the maximum temperature permitted there unless the density curve is flattened by some means. Higher temperature maxima may be used, but what these temperatures will be will depend upon the heat conductivity of the uranium, the jacket and the jacket-uranium interface, and the cooling efficiency.

In the initial loading of the graphite cube 10 with the uranium slugs 35, loading is started by filling the central air channel 12 with 68 slugs. A shielded car 51 is used for this loading. Proceeding outwardly and preferably concentrically, additional channels are loaded. The neutron activity increases as additional channels are loaded until the critical size of the reactor is reached. The reactor is then capable of a chain reaction. The control rod 41 is, however, inserted into the reactor to prevent the chain reaction, and additional channels are loaded until the desired maximum reproduction ratio of, for example, 1.005 to 1.006 is attained. Graphite plugs are then placed in the remaining empty air channels 12.

Figure 3:
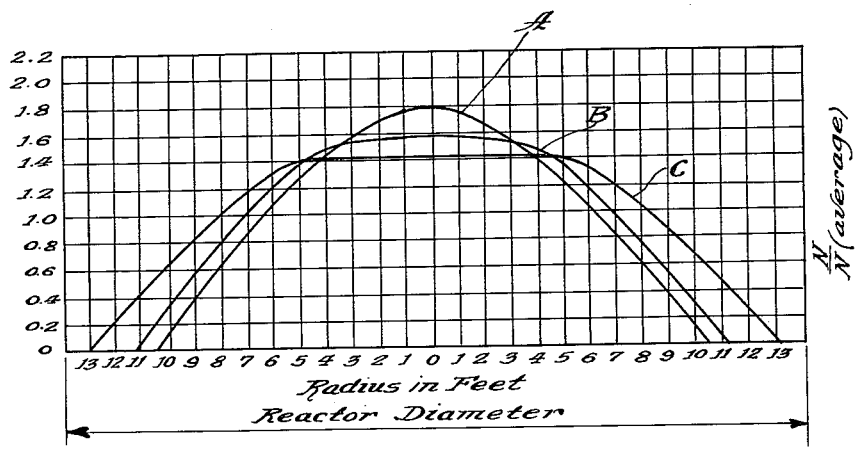
FIG. 3 is a graph showing relative neutron densities across the diameter of the reactor.

As the geometry of the disposition of the uranium in the moderator of the active portion of the reactor is uniform throughout in the loading above described, and the moderator density is uniform, it follows that the K factor throughout the entire reactor is also uniform (provided all slugs are alike), leading to a reactor activity across the reactor having a distribution curve generally resembling a cosine curve as indicated by curve A in FIG. 3, which is a diagram in which the ratios of local neutron density to the average neutron densities are plotted for different radial distances from the center of the reactor.

Curve A is a centrally peaked curve, indicating that when the maximum slug temperature is set, say at 200° C., the total power at which the reactor can operate is limited by the central reactor activity required to bring the central slugs up to that temperature. It will be assumed that there is proper cooling and that the 200° C. temperature is attained at a total power output of 5000 kw. It can also be assumed that the uniform geometry used provides a K factor of about 1.06 throughout the reactor to give a self-sustaining chain reaction in the reactor at the size described. Unless the temperature of the central uranium is permitted to rise, assuming maximum cooling, no more power can be obtained from the reactor under these conditions.

However the density of the moderator in all parts of the reactor and hence the K factor, does not need to be uniform, if the average K factor of the reactor is left sufficiently high so that the critical size does not become too large to be practical. It has been found if lattices having K factors that differ in the center of the reactor and in shells or zones surrounding the center are utilized, that when the reactor is assembled with the lattice having the K factor which is lower at the center than at an outer zone thereof, a reactor can be built wherein the reactor activity is no longer peaked, but is flattened across the reactor as shown in curves B and C, FIG. 3. This type of activity distribution may be so adjusted that the neutron density is substantially constant throughout the reactor or a major portion thereof. In such a case for the same total power output, neutron densities around the central slugs and consequently, the slug temperatures, will fall, and the temperatures of the slugs in the intermediate zones will more nearly approach those in the slugs in the center of the reactor. Under these conditions, the total power output of the reactor can then be raised until the more widespread central neutron density is the same as when the activity follows curve A, and the central slugs are at the maximum permissible temperature again. If it is assumed that cooling is uniform throughout the reactor, more slugs than before will then be at or near maximum temperature and the total power output can be greatly increased.

Figure 7:
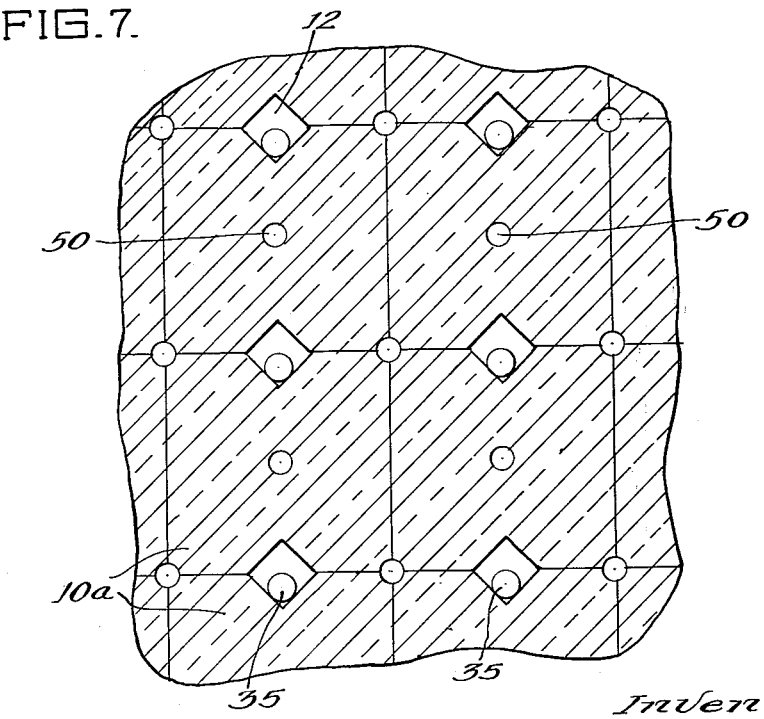
FIG. 7 is an enlarged cross-sectional view of a portion of the lattice of FIG. 2 showing channels in addition to the channels containing fissionable material.

There has been discovered a practical method of achieving the desired flattened activity curve by increasing the migration area $M^2$ in the center of the reactor over the migration area in the remainder of the reactor. In a given moderator, such as graphite, this migration area may be changed by reducing the effective denstiy of the graphite. For example, as shown in FIG. 7 channels 50 are drilled in the moderator between the uranium carrying channels 12 in the central volume of the reactor (shown inside circle B in FIG. 2). Plugs may be positioned in the ends of said channels 50 to prevent the movement of cooling air through said channels, if it is desired to force all the air over the fissionable bodies. Thus there are in this region because of these additional channels 50 less carbon atoms per unit cell, against which the neutrons can collide and be slowed than in the remainder of the reactor. For this reason a percentage of the neutrons which would reach thermal energy and cause a fission in the central volume in a uniform moderator, instead, because of the reduction in effective density, reach an outer volume and cause a fission there, thus reducing the number of possible fissions in the central volume and increasing the fissions in the outer volume.

It can be shown that channels or ducts drilled in a moderator affect the K factor as though $M^2$, the migration area, had been multiplied by $$\left(1+2\phi+\frac{2.67a\phi}{\lambda}\right)$$

where:

$\phi$ is the fraction of the reactor volume occupied by said channels, $\lambda$ is the mean free path of a neutron in the reactor, which is approximately 2.7 cm. for the described reactor, and "$a$" is the radius of the channels.

As has been previously stated, $K=1-M^2\Delta$ and, therefore, it can be seen that the reduction of K due to drilling a number of ducts of a given size may be calculated.

The size and number of channels drilled in the moderator will depend on the amount of excess K available in the designed reactor. However, for maximum production of $94^{239}$, the greatest number of channels are in the center of the reactor with a diminishing size and/or number of channels per unit volume from the center to the exterior. By this means, the migration area is made greatest at the center and least near the exterior of the reactor.

Other means of changing the migration area in the moderator may also be used. For example, it is possible to use a graphite of lesser actual density in the center than in the remainder of the reactor. In general, in reactor construction the most dense graphite available is used in order to have the greatest number of carbon atoms per unit volume available so that the maximum moderation is achieved. However, it is possible to manufacture graphite that is lesse dense than that generally used in reactors. If this less dense graphite is used, the migration area is increased and by building a reactor having less dense graphite in the center, the moderating effect is reduced ant results similar to those explainet for drilling channels in the moderator may be achieved.

Pile flattening by using different effective densities of moderator in the same reactor has several advantages over other methods. In the first place, the uniform spacing of the fissionable material is not disturbed. Uniform spacing simplifies the design and operation of a reactor and is, therefore, to be desired. A second advantage is that the amount of fissionable material is not lessened from that used in the uniform reactor and may even be increased. Since the amount of product varies directly with the amount of fissionable material subjected to neutron bombardment this is an important consideration. A third advantage lies in the fact that no neutrons are removed from the chain reaction by increasing the migration area, as in the case when neutron absorbers are used for flattening the reaction curve.

While the method and means of controlling the activity curve have been described in connection with a graphite moderated air cooled reactor, it will be apparent to those skilled in the art that the invention is equally operable in other types of reactors. For example, the same technique could be used on a beryllium or beryllium oxide moderated reactor.

While the invention has been described with reference and is particularly related to use of natural uranium it is applicable to other mixtures of $U^{238}$ and $U^{235}$ or to other thermally fissionable isotopes which yield neutrons. For example $U^{233}$ or $94^{239}$ may be used in lieu of $U^{235}$. Moreover mixtures of any of these fissionable isotopes with $Th^{232}$ or other isotope which upon neutron absorption ultimately forms such a thermally fissionable isotope may be used in accordance with this invention.

While the theory of the nuclear chain fission mechanism in uranium set forth herein is based on the best presently known experimental evidence, additional experimental data later discovered may modify the theory disclosed without affecting the teachings of the invention.

The term uranium as used in the claims is intended to include uranium in both elemental and combined form unless otherwise specified.

The above description is meant to be illustrative only and the scope of the invention is limited only by the appended claim.

What is claimed is:

A nuclear reactor comprising a mass of graphite having a plurality of spaced, parallel through channels arranged in a regular lattice, and natural uranium bodies arranged in said channels, the mass of graphite having additional channels free of uranium bodies and laterally displaced from the first-mentioned channels so as to be out of the lattice, the greatest number of additional channels being in the center of the reactor with a diminishing number of channels per unit volume from the center to the exterior, the additional channels having the effect of reducing the density of the graphite more at the center than at the exterior of the reactor thereby spreading neutron activity throughout the reactor.

References Cited in the file of this patent

UNITED STATES PATENTS 2,774,730     Young _____ Dec. 18, 1956

FOREIGN PATENTS 114,150     Australia _____ May 2, 1940
233,011     Switzerland _____ Oct. 2, 1944

OTHER REFERENCES

Smyth: "Atomic Energy for Military Purposes," pages 103, 104, 177–180, August 1945.

Kelly et al.: Physical Review 73, 1135–9 (1948).